United States Patent
Castrogiovanni et al.

(10) Patent No.: US 12,231,285 B2
(45) Date of Patent: Feb. 18, 2025

(54) TELECOMMUNICATION NETWORK ALARM MANAGEMENT

(71) Applicant: Telecom Italia S.p.A., Milan (IT)

(72) Inventors: Pino Castrogiovanni, Turin (IT); Roberta Giannantonio, Turin (IT); Ennio Grasso, Turin (IT); Pier Giorgio Santandrea, Bologna (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 18/268,011

(22) PCT Filed: Nov. 23, 2021

(86) PCT No.: PCT/EP2021/082670
§ 371 (c)(1),
(2) Date: Jun. 16, 2023

(87) PCT Pub. No.: WO2022/135813
PCT Pub. Date: Jun. 30, 2022

(65) Prior Publication Data
US 2024/0113932 A1 Apr. 4, 2024

(30) Foreign Application Priority Data
Dec. 21, 2020 (IT) .................. 102020000031706

(51) Int. Cl.
*H04L 41/0604* (2022.01)
*H04L 41/147* (2022.01)
(Continued)

(52) U.S. Cl.
CPC ........ *H04L 41/0604* (2013.01); *H04L 41/147* (2013.01); *H04L 41/16* (2013.01); *H04L 41/5074* (2013.01)

(58) Field of Classification Search
CPC ... H04L 41/0604; H04L 41/147; H04L 41/16; H04L 41/5074
(Continued)

(56) References Cited

U.S. PATENT DOCUMENTS 6,507,012 B1 * 1/2003 Medard ................. H04B 10/85
356/73.1
2010/0289638 A1 11/2010 Borchers et al.
(Continued)

FOREIGN PATENT DOCUMENTS

WO 2016/141007 A1 9/2016

OTHER PUBLICATIONS

Thesis "Alarm and Service Monitoring of Large-Scale Multi-Service Mobile Networks" by Stefan Wallin, 2009, Luleå University of Technology (ISSN: 1402-1757, ISBN 978-91-86233-34-1).
(Continued)

*Primary Examiner* — Wing F Chan
*Assistant Examiner* — John Fan
(74) *Attorney, Agent, or Firm* — Banner & Witcoff, Ltd.

(57) ABSTRACT

A system for managing network alarms generated by element manager modules responsive to corresponding faults/malfunctioning affecting network nodes or links of a telecommunication network is provided. The system may include an alarm management platform for gathering network alarms and generating a first set of network alarms comprising at least a subset of the gathered network alarms; a network operator unit arranging the network alarms into a network alarm table, and managing the faults/malfunctioning affecting the network nodes or links corresponding to the network alarms; an alarm prediction module receiving from the alarm management platform an alarm duration prediction request about a predicted duration of a selected network alarm and alarm data regarding the selected network alarm
(Continued)

and generating an alarm duration prediction about the predicted duration by processing alarm data regarding the selected network alarm through a first machine learning algorithm trained with alarm data regarding past network alarms.

20 Claims, 5 Drawing Sheets

(51) Int. Cl.
*H04L 41/16* (2022.01)
*H04L 41/5074* (2022.01)

(58) Field of Classification Search
USPC .......................................................... 709/224
See application file for complete search history.

(56) References Cited

U.S. PATENT DOCUMENTS

| | | | |
|---|---|---|---|
| 2015/0195154 A1* | 7/2015 | Hevizi | H04L 43/024 706/50 |
| 2016/0261468 A1* | 9/2016 | Premkumar | H04L 41/069 |
| 2018/0150758 A1 | 5/2018 | Niininen et al. | |

OTHER PUBLICATIONS

Asres Mulugeta Weldezgina et al., "Supporting Telecommunication Alarm Management System With Trouble Ticket Prediction", May 25, 2020 (May 25, 2020), vol. 17, No. 2, p. 1459-1469, XP011821348.
Mijumbi Rashid et al., "Mayor: Machine Learning and Analytics for Automated Operations and Recovery", 2019 28th International Conference on Computer Communication and Networks (ICCCN), IEEE,Jul. 29, 2019 (Jul. 29, 2019), p. 1-9, XP033620581.
Feb. 23, 2022—(WO) Int'l Search Report and Written Opinion—App PCT/EP2021/082670.

* cited by examiner

TELECOMMUNICATION NETWORK ALARM MANAGEMENT

BACKGROUND OF THE INVENTION

Field of the Invention

The present invention relates to the field of the telecommunications. More specifically, the present invention relates to the management of alarms relating to a telecommunication network.

Overview of the Related Art

Modern telecommunication networks—both fixed and mobile—are large and complex systems, comprising a plurality of hardware/software network nodes of different kinds and different technologies interconnected to each other within a large geographic area.

Each network node of a telecommunication network can be affected by faults or malfunctioning of different kinds. In order to allow a correct operation and management of the telecommunication network, alarms (hereinafter, "network alarms") can be advantageously generated in response to the occurrence of faults/malfunctioning affecting the network nodes.

On this regard, the telecommunication network is also advantageously provided with one or more alarm management system configured to gather the network alarms, carry out analysis and/or correlations on/among the gathered network alarms, identify the cause which triggered each network alarm, sort the received network alarms according to a priority ranking, filter the sorted network alarms to obtain a filtered subset of network alarms (sorted according to the priority ranking) and provide the subset of network alarms to a Network Operations Center (hereinafter, "NOC") of the telecommunication network. Then, according to the received subset of network alarms, the NOC will act on telecommunication network parameters and/or perform and/or request fixing actions for solving or at least mitigating the faults which triggered the network nodes of the received subset of network alarms.

Each single network alarm is usually described by a corresponding set of properties having values depending on data generated, processed, modified and enriched by the network nodes and also by the alarm management systems. The values of the properties of a generic network alarm may change during the duration of the network alarm (i.e., the period of time during which the network alarm is active). These changes can be caused by one or more among:
- the network node itself having caused the generation of the network alarm (e.g., because of an update on the network alarm caused by a new condition or operation of the network node);
- the alarm management system (e.g., because the alarm management system calculated a new correlation of the network alarm with a different network alarm);
- the NOC (e.g., because the NOC modified some network parameter or because of the intervention of an operator requested by the NOC).

The analysis, filtering, and/or sorting operations carried out by known alarm management systems on the network alarms are typically based on deterministic rules about domain-knowledge defined by domain experts.

The thesis "*Alarm and Service Monitoring of Large-Scale Multi-Service Mobile Networks*" by Stefan Wallin, 2009, Lulei University of Technology (ISSN: 1402-1757, ISBN 978-91-86233-34-1) collects several papers in the field of telecommunication network management and assurances. In chapter 2.2.2 it is proposed to use a neural network for alarms prioritization/ranking. This document also provides a definition of alarm as "an abnormal state in a resource for which an operator action is required. The operator is alerted in order to prevent or mitigate network and service outage and degradation".

Paper "*Supporting Telecommunication Alarm Management System with Trouble Ticket Prediction*" by Mulugeta Weldezgina Asres, Million Abayneh Mengistu, Pino Castrogiovanni, Lorenzo Bottaccioli, Enrico Macii, Edoardo Patti and Andrea Acquaviva, IEEE TRANSACTIONS ON INDUSTRIAL INFORMATICS, 25 May 2020, discloses data-driven Trouble Ticket prediction models to leverage Alarm Management Systems. To improve performance, feature extraction, using a sliding time-window and feature engineering, from related history alarm streams is also introduced.

US2010289638 relates to a method and device for identification of correlations between alarm messages in an alarm system of a technical installation or a technical process and/or correlations between such alarm messages and operator actions, using a data processing device which has access to recorded historical data which relates to alarm messages and operator actions. The data processing device can use market basket analysis methods to deal with and analyze historical data, which occurs at defined intervals, as a market basket. Quality characteristics can be formed from a relationship between respective operator actions before and after an occurrence of a respective alarm message, and/or from correlations between alarm messages and operator actions, via the data processing device, which has access to the recorded historical data which relates to alarm messages and operator actions.

WO2016141007 discloses one or more techniques and/or systems for suggesting alarm hiding rules and/or alarm groupings. Operator alarms (e.g., a low pressure alarm, a high temperature alarm, etc.) may be stored into alarm baskets based upon alarm occurrence information. The alarm baskets may be defined based upon alarm occurrence overlap, operations (e.g., startup, shutdown, standard procedures, etc.), time slices, timeframes after operator actions (e.g., alarms occurring within 3 minutes after an operator turns off a valve), etc. Alarm hiding rule suggestions (e.g., a suggestion to hide an operator alarm (B) when an operator alarm (A) occurs because the operator alarm (B) usually occurs when the operator alarm (A) occurs) and/or alarm grouping suggestions may be created and provided based upon operator alarms sorted into the alarm buckets. Alarm hiding and grouping rules may be automatically suggested for implementation so that an operator is not overwhelmed with unnecessary operator alarms.

SUMMARY OF THE INVENTION

The Applicant has found that the known alarm management system solutions cited above are not efficient and affected by drawbacks.

The solution disclosed in chapter 2.2.2 of "*Alarm and Service Monitoring of Large-Scale Multi-Service Mobile Networks*" proposes the use of a neural network for alarms prioritization and ranking which is designed to rank alarms based on trouble ticket priorities given in the past by NOC operators. However, this solution provides for carrying out predictions based on subjective data only, being dependent on the subjective behaviors of the operators.

The solution disclosed in "Supporting Telecommunication Alarm Management System with Trouble Ticket Prediction" is similar to the one disclosed in "Alarm and Service Monitoring of Large-Scale Multi-Service Mobile Networks", since it provides for carrying out predictions based on subjective data. The drawbacks of this solution are the same as the previous one, exacerbated by the fact that algorithm outcomes are used to hide low-ranked alarms and wrong predictions can then cause the loss of important alarms that need to be managed.

The solution disclosed in US2010289638 provides for grouping correlated alarms and displaying only a subset thereof. Operators cannot therefore benefit from the capability of analyze all the generated alarms.

The solution disclosed in WO2016141007 proposes a binning method in which alarms are grouped into alarm baskets based on their time of occurrence. However, the alarm baskets regard only time, and in any case the baskets are defined by manual rules.

In view of the above, the Applicant has devised a solution for improving the efficiency and reliability of the known alarm management system based on machine learning techniques.

The proposed solution uses machine learning techniques, in an alarm management system configured to manage network alarms, to make an alarms ranking possible based on an alarm importance degree.

The alarm importance degree is calculated according to different properties of the alarm itself (such as, duration, severity and geographical location).

The alarm importance may be also calculated based on actions undertaken by the operators (such as, trouble ticket opening, annotation added to an alarm and technician intervention needed to solve a fault).

The solution proposed by the Applicant provides for predicting properties of the alarm that are selected based on their significance. The selected properties may be indicative of an objective alarm behavior and/or based on subjective choices of human operators.

The solution proposed by the Applicant advantageously uses the outputs of the implemented machine learning algorithms to trigger an action automatically performed by the alarm management system.

The proposed solution may advantageously allow operators to focus their attention on the most important/significant network alarms.

In this way, the time needed for the identification of the root cause of each alarm and the consequent resolution of the underlying fault can be advantageously reduced.

An aspect of the present invention relates to a system for managing network alarms.

The network alarms are generated by element manager modules in response to corresponding faults/malfunctioning affecting network nodes or links of a telecommunication network.

The system comprises an alarm management platform configured to gather the network alarms and to accordingly generate a first set of network alarms comprising at least a subset of the gathered network alarms.

The system further comprises a network operator unit configured to arrange the network alarms of the first set into a network alarm table providing for each network alarm listed in the network alarm table data describing the network alarm.

The network operator unit is further configured to manage the faults/malfunctioning affecting the network nodes or links corresponding to the network alarms by exploiting the network alarm table.

The system further comprises an alarm prediction module configured to receive from the alarm management platform an alarm duration prediction request about a predicted duration of a selected network alarm and alarm data regarding the selected network alarm and accordingly generate an alarm duration prediction about a predicted duration of the selected network alarm by processing the alarm data regarding the selected network alarm through a first machine learning algorithm trained with alarm data regarding past network alarms gathered by the AM system.

The alarm management platform is configured to generate the at least a subset of the gathered network alarms for generating the first set of network alarms conditioned to the alarm duration predictions.

According to an embodiment of the present invention, the alarm prediction module is configured to generate the alarm duration prediction by calculating, based on the alarm data regarding the selected network alarm, a duration probability indicative of a probability that the selected network alarm will have a duration shorter than a corresponding alarm duration threshold.

According to an embodiment of the present invention, the alarm management platform is configured in such a way that if the duration probability calculated by the alarm prediction module is lower than a corresponding duration probability threshold, the alarm management platform inserts the selected network alarm into the first set of network alarms.

According to an embodiment of the present invention, the alarm management platform is configured in such a way that if the duration probability calculated by the alarm prediction module is higher than or equal to the duration probability threshold, the alarm management platform inserts the selected network alarm in a waiting queue for a time period corresponding to the alarm duration threshold, and then inserts the selected network alarm into the first set of network alarms if the selected network alarm is not subsided yet after the expiration of the alarm duration threshold.

According to an embodiment of the present invention, the selected network alarm is generated in response to faults/malfunctioning affecting a first network node of the telecommunication network.

According to an embodiment of the present invention, the alarm prediction module is configured to generate the alarm duration prediction by processing, in addition to the alarm data regarding the selected network alarm, alarm data regarding prior network alarms generated in response to foregoing faults/malfunctioning affecting at least one among:

the first network node;
network nodes or links that are logically connected to the first network node, and
network nodes that are geographically located close to the first network node.

According to an embodiment of the present invention, the alarm prediction module is configured to receive from the alarm management platform a trouble ticket prediction request corresponding to the selected network alarm and accordingly generate a trouble ticket prediction by processing the alarm data regarding the selected network alarm to calculate a trouble ticket probability indicative of a probability of the need of issuing a Trouble ticket for solving faults/malfunctioning affecting a network node corresponding to the selected network alarm.

According to an embodiment of the present invention, the selected network alarm is generated in response to faults/malfunctioning affecting a first network node of the telecommunication network.

According to an embodiment of the present invention, the alarm prediction module is configured to generate the trouble ticket prediction by processing, in addition to the alarm data regarding the selected network alarm, alarm data regarding prior network alarms generated in response to foregoing faults/malfunctioning affecting at least one among:
- the first network node;
- network nodes or links that are logically connected to the first network node, and
- network nodes that are geographically located close to the first network node.

According to an embodiment of the present invention, the alarm prediction module is configured to calculate the trouble ticket probability by processing the alarm data regarding the selected network alarm through a second machine learning algorithm trained with alarm data regarding past network alarms gathered by the AM system.

According to an embodiment of the present invention, the first machine learning algorithm is trained independently from the second machine learning algorithm.

According to an embodiment of the present invention, the alarm management platform is configured in such a way that if the trouble ticket probability is higher than or equal to a ticket probability threshold, it generates a trouble ticket regarding the selected network alarm.

According to an embodiment of the present invention, the alarm management platform is configured in such a way to insert the selected network alarm in a waiting queue before adding the selected network alarm to the first set based on a combination of the duration probability and the trouble ticket probability.

According to an embodiment of the present invention, the alarm data regarding a network alarm comprise at least one among:
- data indicative of an active/inactive status of the network alarm;
- data about a severity level of the network alarm among a set of predetermined severity levels;
- data about the geographical location of the network node having triggered the network alarm;
- an identifier of the network node having triggered the network alarm;
- data providing a category identifier of the network alarm;
- collected system logs regarding the network alarm.

Another aspect of the present invention relates to a method for managing network alarms generated by element manager modules in response to corresponding faults/malfunctioning affecting network nodes of a telecommunication network.

The method comprising:
- gathering the network alarms and accordingly generating a first set of network alarms comprising at least a subset of the gathered network alarms;
- arranging the network alarms of the first set into a network alarm table providing for each network alarm listed in the network alarm table data describing the network alarm,
- managing the faults/malfunctioning affecting the network nodes corresponding to the network alarms by exploiting the network alarm table;
- receiving an alarm duration prediction request about a predicted duration of a selected network alarm and alarm data regarding the selected network alarm and accordingly generating an alarm duration prediction about a predicted duration of the selected network alarm by processing the alarm data regarding the selected network alarm through a first machine learning algorithm trained with alarm data regarding past gathered network alarms, wherein:
- the at least a subset of the gathered network alarms for generating the first set of network alarms is generated conditioned on the alarm duration predictions.

BRIEF DESCRIPTION OF THE DRAWINGS

These and other features and advantages of the solution according to the present invention will be better understood by reading the following detailed description of an embodiment thereof, provided merely by way of non-limitative example, to be read in conjunction with the attached drawings. On this regard, it is explicitly intended that the drawings are simply used for conceptually illustrating the described structures and procedures. Particularly.

DETAILED DESCRIPTION

Figure 1:
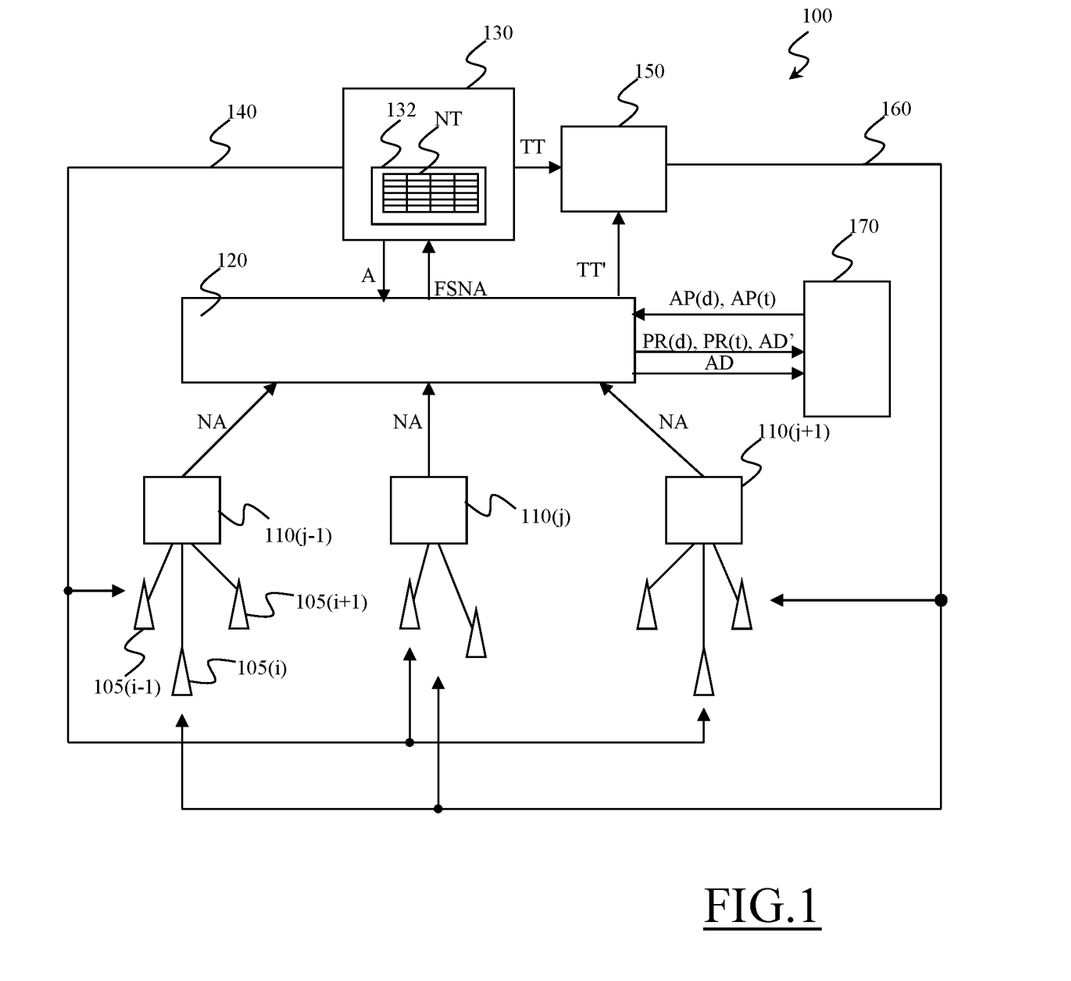
FIG. 1 illustrates in terms of functional modules a system for managing network alarms according to an embodiment of the present invention.

FIG. 1 illustrates in terms of functional modules a system 100 for managing network alarms relating to network nodes 105(i) (i=1, 2, ... ) or links of a telecommunication network in response to faults/malfunctioning affecting the network nodes 105(i) or links, and fixing or resolving the faults/malfunctioning in which concepts according to embodiments of the present invention can be applied.

It should be noted that the terms 'unit', 'system', 'platform', 'node' or 'module' are herein intended to comprise, but not limited to, hardware, firmware, software, and combinations thereof.

For example, a unit, system, platform, node or module may be, but is not limited to being, a process running on a processor, a processor, an object, an executable, a thread of execution, a program, and/or a computing device.

In other words, a unit, system, platform, node or module may comprise an application being executed on a computing device and/or the computing device itself.

One or more units, systems, platforms, nodes or modules may be localized on one computing device and/or distributed between two or more computing devices.

Units, systems, platforms, nodes or modules may comprise and/or interact with computer readable media storing data according to various data structures.

The units, systems, platforms, nodes or modules may communicate by exploiting local and/or remote processes, preferably by means of electrical, electromagnetic and/or optical signals providing one or more data packets, such as data packets from one unit, system, platform, node or module interacting with another unit, system, platform, node or module in a local system, in a distributed system, and/or across a radio network and/or a wired network.

The concepts of the present invention apply to any generic telecommunication network comprising network nodes 105(i), without any limitation regarding the kind and typology thereof. For example, the telecommunication network may be a wireless communication network, such as for example a mobile communication network (e.g., a 3G, 4G or 5G mobile communication network), a wired communication network (e.g., a switched telephone network, a DSL communication network, or a fiber communication network) or a combination of wireless and wired communication networks.

In this context, by network node 105(i) it is intended any kind of device/apparatus deployed in a geographic area that is able to send, receive, forward data/information to other network nodes 105(i) belonging to the same or distinct telecommunication networks, and/or to user equipment/computers/terminals coupled to the telecommunication network, and/or provide specific network services.

Non-limiting examples of network nodes 105(i) may comprise NodeB, eNodeB, RNC, DSLAM, telephone switches, routers, and so on.

The system 100 comprises a plurality of Element Managers (EM) modules 110(j) (j=1, 2, . . . ), each one associated with a set of network nodes 105(i) and configured to generate a network alarm NA when one (or more) of the network nodes 105(i) associated thereto is affected by a fault or a malfunctioning.

As will be described in greater details in the following, a generic network alarm NA is described by a corresponding set of properties. Different kinds of network alarms NA can be generated by the EM modules 110(j), based on the kind of fault/malfunctioning affected by the corresponding network node 105(i). An exemplary and non-limiting list of network alarms NA may include alarms caused by the interruption of services provided by the network node 105(i), alarms caused by a hardware malfunctioning affecting the network node 105(i), alarms caused by a software malfunctioning affecting the network node 105(i), alarms caused by the network node 105(i) (supply and/or conditioning) infrastructure.

The system 100 further comprises one or more (only one illustrated in FIG. 1) Alarm Management (AM) systems (or platforms) 120, each one configured to gather the network alarms NA from the EM modules 110(j).

The AM system 120 is configured to standardize the properties of the received network alarms NA to reach an abstraction degree such to remove all the possible differences among network alarm NA properties caused by different vendors syntactic and by semantic discrepancies.

The AM system 120 is further configured to carry out analysis on the gathered network alarms NA, for example to identify the cause which triggered each received network alarm NA.

The AM system 120 is further configured to correlate the gathered network alarms NA, sort the gathered network alarms NA, for example according to a priority ranking, and filter the sorted network alarms NA according to the priority ranking in such a way to discard some network alarms NA (e.g., network alarms NA having a low priority ranking) and provide to one or more Network Operation Center (NOC) units 130 (only one illustrated in FIG. 1) of the telecommunication network a set FSNA of network alarms NA, comprising the network alarms NA that have not been discarded (filtered out) by the filtering.

The NOC unit 130 is arranged to monitor, control, and manage the network nodes 105(i) in response to the network alarms NA received from the AM system 120. Thanks to the filtering action performed by the AM system 120, instead of having to directly face all the network alarms NA generated by the EM modules 110(j), the NOC unit 130 advantageously receives only a reduced set (i.e., the set FSNA) of network alarms NA, i.e., the network alarms NA considered to have the highest importance.

The NOC unit 130 is configured to arrange the network alarms NA received from the AM system 120 into a network alarm table NT, which may be displayed on one or more display devices 132, such as monitors, screens and/or video walls of the NOC unit 130 for being inspected by operators of the NOC unit 130.

The network alarm table NT lists the network alarms NA received by the NOC unit 130, and for each listed network alarm NA provides a corresponding set of properties P whose values describe the network alarm NA itself.

An exemplary and non-limiting list of properties P included in a network alarm table NT corresponding to a generic network alarm NA is provided hereinbelow.

Alarm duration: this property may comprise first data having a value indicative of the time of a first occurrence of the network alarm NA and second data having a value indicative of the time of a last occurrence of the network alarm NA.

Status: this property may comprise data having a value indicative of an active status or a value indicative of an inactive status of the network alarm NA. Additionally, in case of flapping deduplicated network alarms NA this property may further comprise data having a value indicative of an occurrences number of the network alarm NA.

Severity: this property may comprise data whose value provides an indication about the severity level of the network alarm NA, for example among a group of predetermined severity levels (e.g., "critical", "major", "minor", "warning", "clear").

Location: this property may provide data regarding information about the geographical location of the network node 105(i) triggered the network alarm NA, and/or an identifier of the network node 105(i).

Description: this property may comprise data relating to a category name providing a description of the kind of network alarm NA, its features and collected system logs.

Ack: this property may comprise data providing information specifying whether the network alarm NA has been already acknowledged or not by the NOC unit 130. By acknowledgment of a network alarm NA by the NOC unit 130 it is herein intended a situation in which the network alarm NA received special attention by NOC unit 130, for example in the form of annotation added by the NOC unit 130 on the network alarm NA.

TT: this property may comprise data providing information specifying whether the network alarm NA require the issuing of a Trouble Ticket TT, i.e., a request for the direct intervention of a technician for the resolution of the fault/malfunctioning affecting the link or network node 105(i) triggered the network alarm NA.

Some properties P may assume static, unchanging values, while the values of other properties P may dynamically change over time.

Moreover, when a new network alarm NA is generated, the value of some of the properties P thereof may still be undefined. For example, when a new network alarm NA is generated, the values of some of the properties, e.g. Alarm duration, Ack, TT, are undefined, and therefore not provided to the operators of the NOC unit 130 (e.g., not displayed on the display devices 132).

The network alarm table NT is advantageously exploited by the NOC unit 130 for monitoring the network alarms NA that are currently active, and for deciding when and how to act to solve the issues (faults/malfunctioning) affecting network nodes 105(i) which triggered selected network alarms NA listed in the alarm table NT.

For example, the NOC unit 130 may provide for the resolution of the issues (faults/malfunctioning) affecting a network node 105(i) which triggered a network alarm NA by directly acting on parameters affecting the operations of the telecommunication network and/or of the network node 105(i) (this direct action is depicted in FIG. 1 by means of arrow 140), or by issuing a corresponding Trouble Ticket TT to be sent to a trouble ticket manager 150, which will then resolve it remotely or provide for the corresponding dispatching of a technician (e.g., to the network node 105(i) triggered the network alarm NA) for the resolution of the issue (the technician action is depicted in FIG. 1 by means of arrow 160).

Moreover, as already mentioned above, the NOC unit 130 is configured to provide the AM system 120 with annotations A to be added to selected network alarms NA (e.g., by setting a corresponding value for the property Ack) for informing the AM system 120 that the selected network alarms NA have been acknowledged by the NOC unit 130 as network alarms NA to be taken into considerations because triggered by fault/malfunctioning that needs to be solved.

According to an embodiment of the present invention, the system 100 further comprises an alarm prediction module 170 coupled to the AM system 120 for exchanging data and requests.

According to an embodiment of the present invention, the alarm prediction module 170 is configured to receive from the AM system 120 alarm data AD regarding and/or describing network alarms NA collected and managed by the AM system 120. According to an embodiment of the present invention, the alarm data AD may comprise (and/or may be derived from) at least a subset of the properties P used in the network alarm table NT. According to an embodiment of the present invention, alarm data AD are periodically provided to the alarm prediction module 170 in such a way that the alarm prediction module 170 is provided with updated values of the properties P used in the network alarm table NT.

According to an embodiment of the present invention, the alarm prediction module 170 is also configured to receive prediction requests PR(d), PR(t) generated by the AM system 120 relating to network alarms NA, and to generate corresponding alarm predictions AP(d), AP(t) regarding specific properties P of the network alarms NA collected by the AM system 120.

According to an embodiment of the present invention, the AM system 120 is configured to take advantage of the alarm predictions AP(d), AP(t) to better describe the collected network alarms NA for influencing the generation of the network alarm table NT in order to improve the way the network alarms NA are presented at the NOC unit 130.

According to an embodiment of the present invention, each prediction request PR(d), PR(t) relating to a network alarm NA is sent by the AM system 120 to the alarm prediction module 170 along with alarm data AD' comprising the current values of a set of properties P of the network alarm NA. In this way, the alarm prediction module 170 is provided with data describing the current situation of the network alarm NA for which the received prediction request PR(d), PR(t) has been issued.

According to an embodiment of the present invention, the prediction requests PR(d), PR(t) comprise a duration prediction request PR(d) of the property Alarm duration, i.e., the duration of a specific network alarm NA.

According to an embodiment of the invention, the alarm prediction module 170 is configured to generate duration predictions AP(d) about the duration of specific network alarms NA in response to a duration prediction request PR(d).

According to an embodiment of the present invention, the AM system 120 is configured to exploit the duration predictions AP(d) about the duration of specific network alarms NA for carrying out an improved filtering procedure on the received network alarms NA. According to an embodiment of the present invention, the improved filtering procedure provides for delaying the insertion in the FSNA set of those network alarms NA that have a sufficiently high probability of expiring in a limited time interval, because the fault/malfunctioning which triggered such network alarms NA is caused by temporary factors (e.g., network traffic load or weather condition) and will resolve without intervention by the NOC unit 130.

Delayed network alarms NA that have resolved before the expiration of the applied delay will not be included in the FSNA set. In this way, the network alarm table NT displayed at the NOC unit 130 will contain fewer entries and the NOC unit 130 will advantageously have to monitor and manage a reduced number of network alarms NA.

According to an embodiment of the present invention, the alarm prediction module 170 is configured to generate ticket predictions AP(t) about the need of issuing a Trouble Ticket TT for resolving the fault/malfunctioning triggering specific network alarms NA in response to a trouble ticket prediction request PR(t).

According to an embodiment of the present invention, the AM system 120 is configured to exploit the ticket predictions AP(t) about the need of issuing a Trouble Ticket TT for specific network alarms NA for deciding if automatically generating automatic Trouble Tickets (identified in FIG. 1 with reference TT' in order to distinguishing them from Trouble Tickets TT requested by the NOC unit 130) to be automatically sent to the trouble ticket manager 150 without involving (and thus without burdening) the NOC unit 130.

According to an embodiment of the present invention, the prediction module 170 is configured to generate the duration predictions AP(d) and/or ticket predictions AP(t) based on a machine learning approach using machine learning algorithms that are trained by learning from alarm data AD corresponding to past network alarms NA collected by the AM system 120 instead of being based only on deterministic rules. The prediction module 170 can therefore update (e.g., to match specifications and needs of new network node 105(i)) itself automatically as new alarm data AD is received, without the need of a manual update to be carried out by domain experts.

According to an embodiment of the present invention, the prediction module 170 is configured so that when it receives a prediction request PR(d), PR(t) regarding a specific network alarm NA, it carries out the following operations:

- processing the received alarm data to extract the values of the properties P corresponding to the specific network alarm NA and for each property P extract/calculate a corresponding feature F (i.e., a descriptive attribute properly formatted to be suitably ingested by a machine learning algorithm);
- providing the extracted/calculated features F as inputs to a (pretrained) machine learning algorithm to generate a value of a label L, wherein the value is indicative of the requested prediction;
- obtaining the requested alarm prediction AP(d), AP(t) based on the generated value of the label L.

According to an embodiment of the present invention, when a duration prediction request PR(d) regarding a network alarm NA is received, the prediction module 170 is configured to predict a value of a label Alarm duration indicative of a predicted duration of the network alarm NA. According to an embodiment of the present invention, when a ticket prediction request PR(t) regarding a network alarm NA is received, the prediction module 170 is configured to predict a value of a label TT indicative of the need of issuing a Trouble Ticket TT for resolving the fault/malfunctioning triggering the network alarms NA.

According to an embodiment of the present invention, the machine learning algorithm implemented by the prediction module 170 is based on gradient boosting decision trees. According to another embodiment of the present invention, the machine learning algorithm implemented by the prediction module 170 is based on artificial neural networks.

According to an embodiment of the present invention, the machine learning algorithms implemented by the prediction module 170 are used to rank the importance for a generic network alarm NA based on the alarm predictions AP(d), AP(t) and the alarm data AD'.

The above notwithstanding, the prediction module 170 can also be advantageously configured to operate in hybrid mode, by combining both machine learning predictions and deterministic rules. For example, data provided by rule-based systems (e.g., network alarm correlations and root cause analysis) can be used for training the machine learning algorithm implemented by the prediction module 170 to improve the predictions of the importance of network alarms NA. As another example, alarm predictions AP(d), AP(t) can be used to enhance deterministic rules (e.g., different ranges of minimum and maximum presentation delays of network alarm NA on the network alarm table NT can be defined for different network alarms NA types/groups, based on expert's domain knowledge, and advantageously combined with alarm predictions AP(d), AP(t)).

Figure 2:
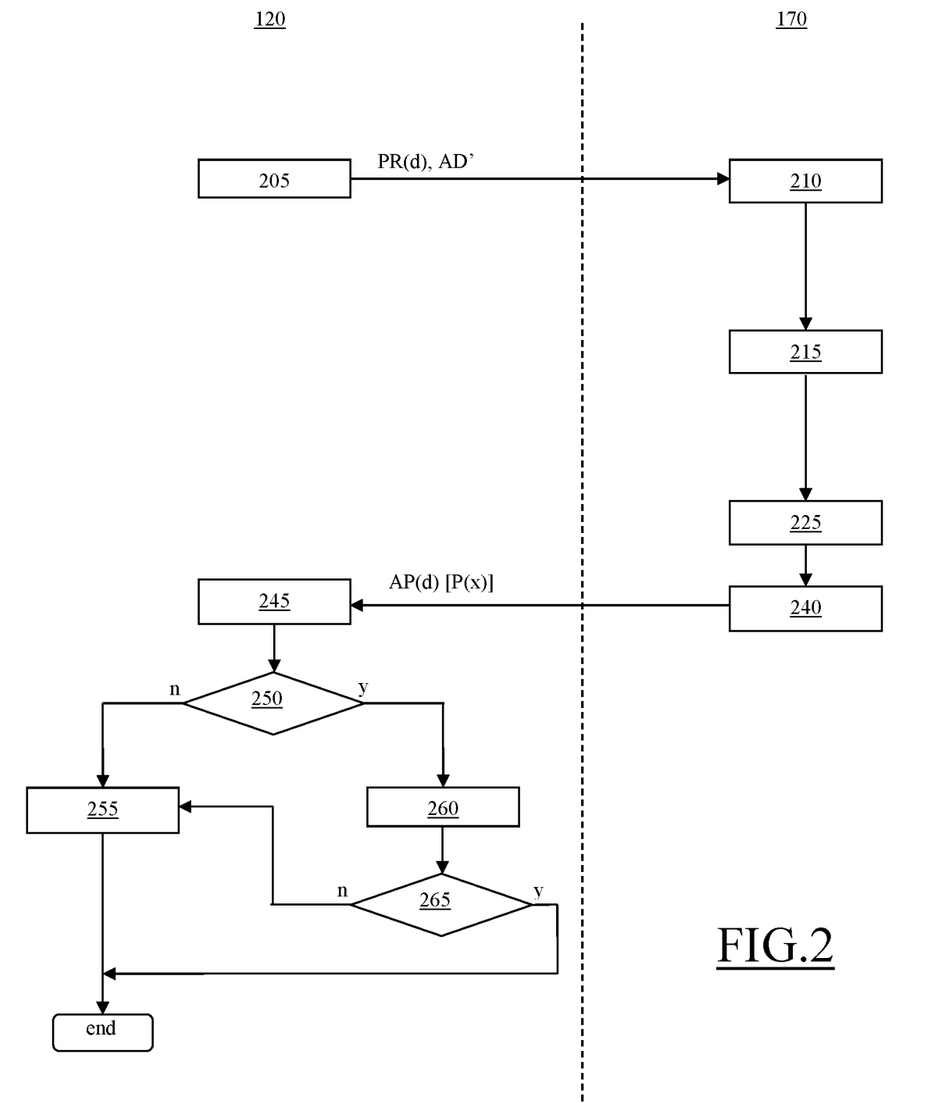
FIG. 2 illustrates the operations carried out by an AM system and by a prediction module when the AM system requests to the prediction module a duration prediction relating to a network alarm according to an embodiment of the present invention.

FIG. 2 illustrates the operations carried out by the AM system 120 and by the prediction module 170 when the AM system 120 requests to the prediction module 170 a duration prediction AP(d) relating to a network alarm NA through a duration prediction request PR(d) according to an embodiment of the present invention.

According to an embodiment of the present invention, the first operation (block 205) corresponds for having the AM system 120 to provide to the prediction module 170 a duration prediction request PR(d) for a duration prediction AP(d) relating to a network alarm NA. According to an embodiment of the present invention, the AM system 120 is configured to send along with the duration prediction request PR(d) alarm data AD' comprising the current values of a set of properties P of the network alarm NA.

According to an embodiment of the present invention, the prediction module 170 collects (block 210) the duration prediction request PR(d) and the corresponding alarm data AD'.

According to an embodiment of the present invention, the prediction module 170 processes the received alarm data AD' and extracts the values of properties P corresponding to the network alarm NA related to the duration prediction request PR(d) to obtain for each one of the properties P a corresponding feature F value (block 215).

Then, according to an embodiment of the present invention, the prediction module 170 accordingly generates (block 225) a short duration alarm probability P(X) providing an indication of the probability that the network alarm NA will have a duration lower than an alarm duration threshold X.

According to an exemplary embodiment of the present invention, the alarm duration threshold X is expressed in terms of minutes (e.g., X=30 minutes). Similar considerations apply in case the alarm duration threshold X is expressed in different units.

According to an embodiment of the present invention, the alarm duration threshold X is a deterministic value, which is set in advance.

According to an embodiment of the present invention, when the duration of a network alarm NA is shorter than the alarm duration threshold X, the network alarm NA is considered to be a "short duration" network alarm NA.

According to an embodiment of the present invention, when the duration of a network alarm NA is equal to or longer than the alarm duration threshold X, the network alarm NA is considered to be a "long duration" network alarm NA.

According to an embodiment of the present invention the AM system 120 is configured to manage each network alarm NA by taking into account whether the network alarm NA is considered a "short duration" network alarm NA or a "long duration" network alarm NA.

In view of the above, the short duration alarm probability P(X) is the probability that the network alarm NA will be considered a "short duration" network alarm NA.

According to an embodiment of the present invention, the machine learning procedure implemented by the prediction module 170 for the generation of the short duration alarm probability P(X) provides for predicting a value of the label Alarm duration according to the values of the features F obtained at block 215 using a machine learning algorithm which maps values of the features F to values of such label Alarm duration.

According to an embodiment of the present invention, the feature-to-label mapping function implemented by the machine learning algorithm is a machine learning function trained and updated using alarm data AD corresponding to past network alarms NA collected by the AM system 120.

Then, according to an embodiment of the present invention, the prediction module 170 provides to the AM system 120 (block 240) the requested duration prediction AP(d) corresponding to the network alarm NA in the form of a set of data comprising the short duration alarm probability P(X).

Once the AM system 120 receives (block 245) the requested duration prediction AP(d), according to an embodiment of the present invention the AM system 120 carry out a comparison (block 250) between the short duration alarm probability P(X) and a duration probability threshold Y indicative of a confidence degree of the duration prediction AP(d).

According to an embodiment of the present invention, the duration probability threshold Y is a real number between 0 and 1 (e.g., Y=0.7). Similar considerations apply in case the duration probability threshold Y is expressed in different terms.

According to an embodiment of the present invention, the duration probability threshold Y is a deterministic value, which is set in advance.

If the short duration alarm probability P(X) is lower than the duration probability threshold Y (exit branch n of block 250), the AM system 120 assesses that the network alarm NA corresponding to the duration prediction AP(d) is considered a "long duration" network alarm NA. In this situation, according to an embodiment of the present invention, the AM system 120 adds (block 255) the network alarm NA to the set FSNA of network alarms NA that are provided to the NOC unit 130 for the generation of the network alarm table NT.

Conversely, if the short duration alarm probability P(X) is higher than or equal to the duration probability threshold Y (exit branch y of block 250), the AM system 120 assesses that the network alarm NA corresponding to the duration prediction AP(d) is considered a "short duration" network alarm NA. In this situation, according to an embodiment of the present invention, the AM system 120 does not add the network alarm NA to the set FSNA, and conveniently such network alarm NA is delayed, for example by inserting such alarm in a temporary waiting queue for a period corresponding to the alarm duration threshold X (block 260).

If the duration prediction AP(d) indicative of a "short duration" is correct and the alarm is not added to the set FSNA, the network alarm NA will subside before the expiration of the time period corresponding to the alarm duration threshold X because the faults/malfunctioning having triggered the network alarm NA will be solved by their own. In this case, according to an embodiment of the present invention, the network alarm NA is therefore never added to the set FSNA (exit branch y of block 265).

Conversely, if the duration prediction AP(d) indicative of a "short duration" is not correct, the network alarm NA will still be active after the expiration of the time period corresponding to the alarm duration threshold X. In this case, according to an embodiment of the present invention the AM system 120 assesses that the faults/malfunctioning having triggered the network alarm NA needs the attention of the NOC unit 130, and therefore the network alarm NA is added to the set FSNA (exit branch n of block 265, going to block 255) to be provided to the NOC unit 130 for the generation of the network alarm table NT.

Thanks to the solution according to this embodiment of the present invention, the NOC unit 130 will have to manage an optimized network alarm table NT comprising a reduced set of network alarms NA, not including the "short duration" network alarms NA corresponding to correct predictions. In this way, the burden of the NOC unit 130 is advantageously reduced, because the NOC unit 130 will not have to manage a subset of network alarms NA that will be solved by their own.

For example, if the alarm duration threshold X is equal to 30 minutes and the duration probability threshold Y is equal to 0.7:

a short duration alarm probability P(X) equal to 0.87 will cause the network alarm NA to be placed in a temporary waiting queue for a time period equal to 30 minutes, and then, the network alarm NA will be inserted in the set FSNA (thus causing the addition of this network alarm NA to the network alarm table NT) only if after the expiration of 30 minutes the network alarm NA is still active;

a short duration alarm probability P(X) equal to 0.63 will cause the network alarm NA to be inserted in the set FSNA (thus causing the addition of this network alarm NA to the network alarm table NT) without delay.

According to an embodiment of the present invention not illustrated in FIG. 2, following the first occurrence of a newly received network alarm NA, such network alarm NA may be pre-emptively delayed by placing it in a corresponding waiting queue for a corresponding waiting time (e.g., depending on the type of network alarm NA) before calculating the alarm duration threshold X, the probability threshold Y, the short duration alarm probability P(X).

Figure 3:
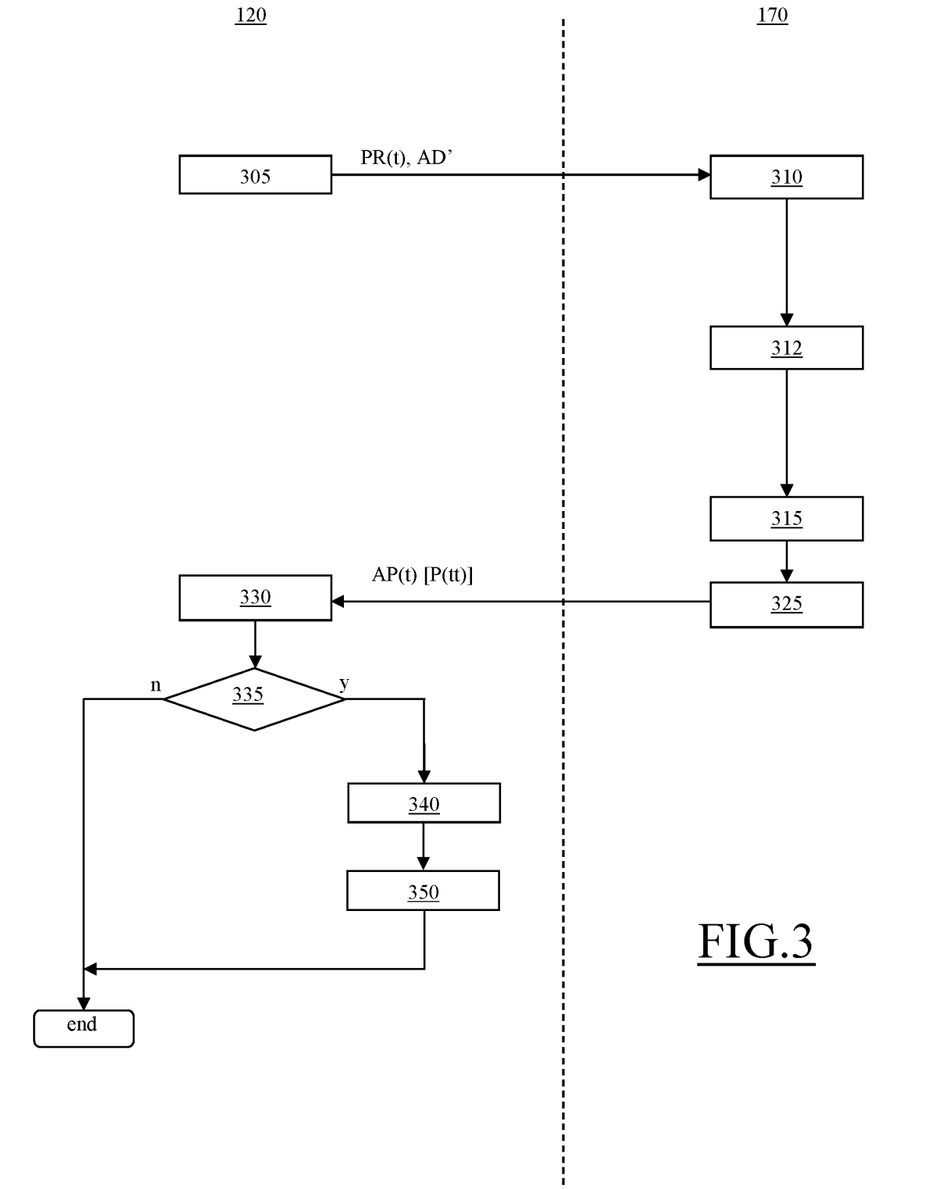
FIG. 3 illustrates the operations carried out by the AM system and by the prediction module when the AM system requests to the prediction module a ticket prediction AP(t) relating to a network alarm according to an embodiment of the present invention.

FIG. 3 illustrates the operations carried out by the AM system 120 and by the prediction module 170 when the AM system 120 requests to the prediction module 170 a ticket prediction AP(t) relating to a network alarm NA through a ticket prediction request PR(t) according to an embodiment of the present invention.

According to an embodiment of the present invention, the first operation (block 305) provides for having the AM system 120 to provide to the prediction module 170 with a ticket prediction request PR(t) for a ticket prediction AP(t) relating to a network alarm NA. According to an embodiment of the present invention, the AM system 120 is configured to send along with the ticket prediction request PR(t) alarm data AD' comprising the current values of a set of properties P of the network alarm NA.

According to an embodiment of the present invention, the prediction module 170 collects (block 310) the ticket prediction request PR(t) and the corresponding alarm data AD'.

According to an embodiment of the present invention, the prediction module 170 processes the received alarm data AD' to extract the values of properties P corresponding to the network alarm NA related to the ticket prediction request PR(t) to obtain for each one of the properties P a corresponding feature F value (block 312).

Then, according to an embodiment of the present invention, the prediction module 170 calculates (block 315) a trouble ticket probability P(tt) providing an indication of the probability that the network alarm NA will require the generation of an automatic Trouble Ticket TT' to be automatically sent to the trouble ticket manager 150.

According to an embodiment of the present invention, the machine learning procedure implemented by the prediction module 170 for the generation of the trouble ticket probability P(tt) provides for calculating a value of the label TT according to the values of the features F obtained at block 312 using a machine learning algorithm which maps values of the features F to values of such label TT.

According to an embodiment of the present invention, the feature-to-label mapping function implemented by the machine learning algorithm is a machine learning function trained and updated using alarm data AD corresponding to past network alarms NA collected by the AM system 120.

Then, according to an embodiment of the present invention, the prediction module 170 provides to the AM system 120 (block 325) the requested ticket prediction AP(t) corresponding to the network alarm NA in the form of a set of data comprising the trouble ticket probability P(tt).

Once the AM system 120 receives (block 330) the requested ticket prediction AP(t), according to an embodiment of the present invention the AM system 120 carries out a comparison (block 335) between the trouble ticket probability P(tt) and a ticket probability threshold Z indicative of a confidence degree of the ticket prediction AP(t).

According to an exemplary embodiment of the present invention, the ticket probability threshold Z is a real number between 0 and 1 (e.g., Z=0.5). Naturally, similar considerations apply in case the ticket probability threshold Z is expressed in different terms.

According to an embodiment of the present invention, the ticket probability threshold Z is a deterministic value which is set in advance.

If the trouble ticket probability P(tt) is lower than the ticket probability threshold Z (exit branch n of block 335), according to an embodiment of the present invention, the AM system 120 assesses that the network alarm NA corresponding to the trouble ticket prediction AP(d) does not require the generation of an automatic Trouble Ticket TT' to be automatically sent to the trouble ticket manager 150.

If instead the trouble ticket probability P(tt) is equal to or higher than the ticket probability threshold Z (exit branch y of block 335), the AM system 120 assesses that the network alarm NA corresponding to the trouble ticket prediction AP(t) requires the generation of an automatic Trouble Ticket TT'. Thus, according to an embodiment of the present invention, the AM system 120 generates an automatic Trouble Ticket TT' (block 340). According to an embodiment of the present invention, the automatic Trouble Ticket TT' is then automatically sent to the trouble ticket manager 150 (block 350).

Thanks to the solution according to this embodiment of the present invention, the NOC unit 130 will not be burdened by the duty of taking decisions about the generation of trouble tickets TT for those networks alarms NA that have been assessed to have high impact and require the intervention of the trouble ticket manager 150.

For example, if the ticket probability threshold Z is equal to 0.5:
a trouble ticket probability P(tt) equal to 0.11 will not cause the generation of an automatic Trouble Ticket TT';
a trouble ticket probability P(tt) equal to 0.64 will cause the generation of an automatic Trouble Ticket TT' and the automatic sending of the latter to the trouble ticket manager 150.

According to an embodiment of the present invention, the procedure for the management of duration prediction requests PR(d) concerning duration predictions AP(d) illustrated in FIG. 2 and the procedure for the management of trouble ticket prediction requests PR(t) concerning trouble ticket predictions AP(t) illustrated in FIG. 3 may be performed independently of each other, or may be performed together, for example in sequence or in parallel, regarding the same network alarm NA or different network alarms NA.

According to an embodiment of the present invention, a single prediction request PR concerning a duration prediction AP(d) and a trouble ticket prediction AP(t) for a same network alarm NA is managed by integrating the procedure illustrated in FIG. 3 in the procedure illustrated in FIG. 2. In this case, the prediction request PR sent by the AM system 120 to the prediction module 170 (together with alarm data AD' comprising the current values of a set of properties P relating to the network alarm NA) will provide to the AM system 120 the short duration alarm probability P(X) and the trouble ticket probability P(tt).

According to an embodiment of the present invention, the check for assessing the need of generating an automatic Trouble Ticket TT' (corresponding to block 335 of FIG. 3) will be carried out only in case the network alarm NA has been assessed to be a "long duration" network alarm NA (corresponding to exit branch n of block 250 of FIG. 2).

According to another embodiment of the invention, both the short duration alarm probability P(X) and the trouble ticket probability P(tt) are combined together for deciding if a network alarm NA should be delayed—for example by being inserted in a temporary waiting queue—before being added to the set FSNA (see block 260 of FIG. 2).

Figure 4:
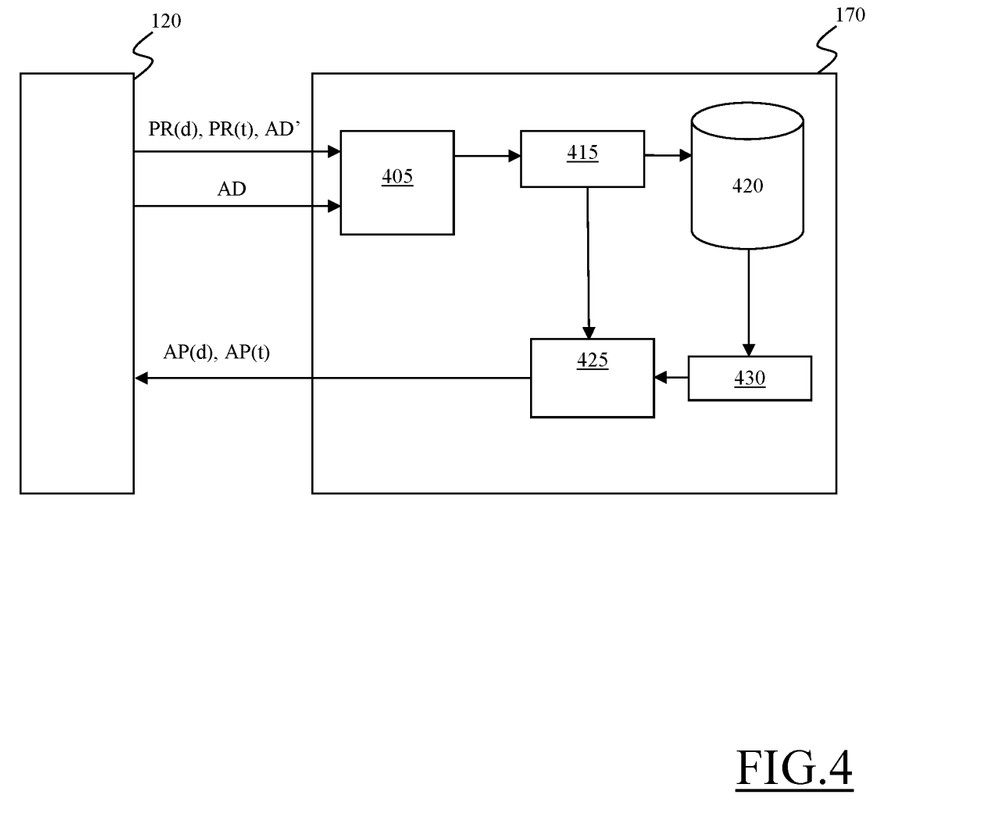
FIG. 4 illustrates sub-modules of the prediction module according to an embodiment of the present invention.

In order to describe in greater detail how the prediction module 170 operates, reference will be now made to FIG. 4, illustrating sub-modules of the prediction module 170 according to an embodiment of the present invention.

According to an embodiment of the present invention, the prediction module 170 comprises a collector submodule 405 configured to collect from the AM system 120:
alarm data AD periodically sent by the AM system 120 regarding and/or describing network alarms NA collected and managed by the AM system 120, comprising updated versions of at least a subset of the properties P used in the network alarm table NT;
duration prediction requests PR(d) regarding specific network alarms NA together with alarm data AD' comprising the current values of a set of properties P of the network alarms NA.
ticket prediction requests PR(t) regarding specific network alarms NA together with alarm data AD' comprising the current values of a set of properties P of the network alarms NA.

According to an embodiment of the present invention, the prediction module 170 comprises a feature submodule 415 adapted to process the properties P included in the alarm data AD to obtain corresponding alarm features F properly formatted in such a way to be ingested by the machine learning algorithm.

According to an embodiment of the present invention, the feature submodule 415 is further adapted to process the properties P included in the alarm data AD' corresponding to a duration prediction request PR(d) or a ticket prediction request PR(t) to corresponding alarm features F properly formatted in such a way to be ingested by the machine learning algorithm.

According to an embodiment of the present invention, the prediction module 170 comprises a feature/label register submodule 420 configured to store alarm features F and labels L corresponding to current and past network alarms NA currently and previously managed by the AM system 120.

According to an embodiment of the present invention, the prediction module 170 further comprises a machine learning prediction submodule 425 configured to generate duration predictions AP(d) and/or trouble ticket predictions AP(t) in response to duration prediction requests PR(d) and/or ticket prediction requests PR(t), respectively, through a machine learning prediction algorithm which is able to classify network alarms NA through a mapping of the alarm features F corresponding to the properties P included in the alarm data AD' provided by feature submodule 415 to corresponding labels L.

According to an embodiment of the present invention, the machine learning prediction submodule 425 is further configured to generate a duration prediction AP(d) and/or a trouble ticket prediction AP(t) pertaining to a specific network alarm NA triggered by a network node 105(i) using—in addition to the alarm features F corresponding to the properties P included in the alarm data AD'—features F corresponding to properties P included in alarm data AD relating to network alarms NA previously triggered (i.e., within a preceding time window) by the network node 105(i) or by a set of network nodes 105(i) that are logically connected and/or geographically located close to the network node 105(i).

According to an embodiment of the present invention, the prediction module 170 further comprises training submodule 430 configured to train the machine learning parameters of the machine learning prediction submodule 425 using historical data derived from the alarm features F and labels L stored in the feature/label register submodule 420.

According to an embodiment of the present invention, the machine learning prediction algorithm implemented by the machine learning prediction submodule 425 is trained to classify network alarms NA exploiting features F and labels L corresponding to alarm data AD chosen based on the kind of telecommunication network the network nodes 105(i) belong to.

For example, in case the telecommunication network is a mobile communication network:
- the labels L predicted by the machine learning prediction submodule 425 may be Alarm duration (indicative of a network alarm NA duration calculated as time of a last occurrence minus time of the first occurrence), and TT (indicative of the requirement of a Trouble ticket issuing);
- the features F used by the machine learning prediction submodule 425 may be obtained from the previously described properties Status, Severity, Location and Description.

By making reference to the exemplary case of a mobile communication network, network alarm NA durations have been shown to have a distribution which does not satisfy assumptions required by regression algorithms (L2 loss assumes a homoscedastic Gaussian noise, and L1 loss an exponential noise).

Figure 5:
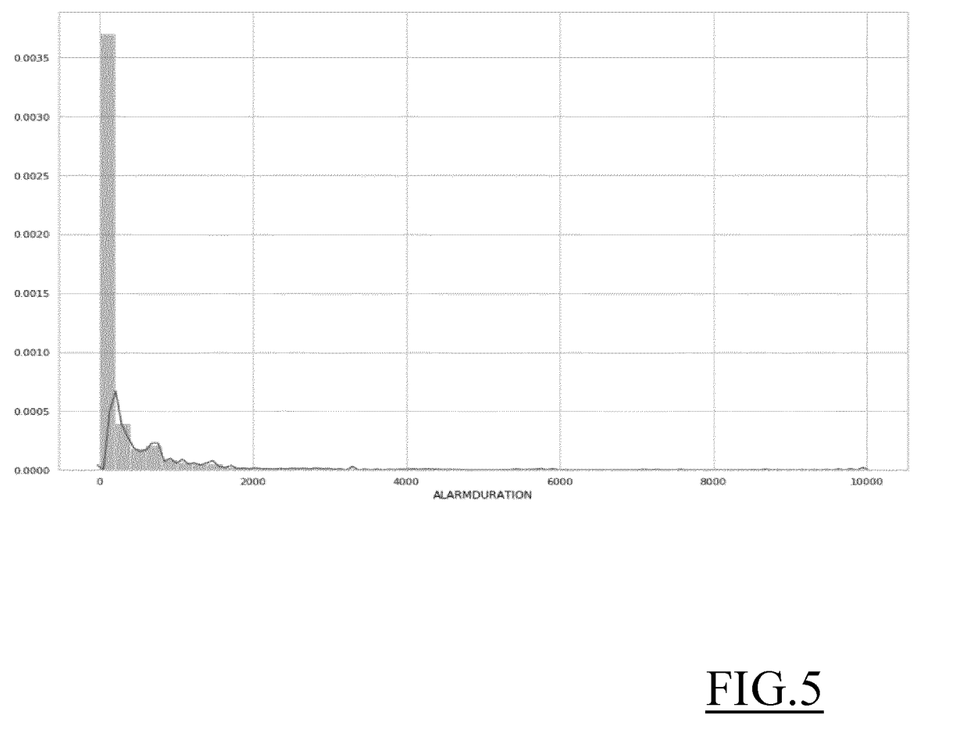
FIG. 5 illustrates an exemplary histogram showing how network alarms can be binned for training a machine learning prediction algorithm implemented by a machine learning prediction submodule according to an embodiment of the present invention.

For this reason, according to an embodiment of the present invention, the network alarm NA durations are binned into a histogram of empirical distribution (an example of which is illustrated in FIG. 5), and the machine learning prediction algorithm implemented by the machine learning prediction submodule 425 is trained as a classifier on the resulting bins.

By using cross-entropy loss on the class predicted by the machine learning prediction algorithm, which is akin to the Kullback Leibler (KL) divergence between the predicted distribution and the empirical distribution, no assumptions are made on the density distribution of alarms' durations.

According to an exemplary embodiment of the present invention, network alarms NA relating to a mobile telecommunication network have been split into 6 classes depending on their duration in minutes, i.e., (0, 15']-(15', 30']-(30', 60']-(60', 120']-(120', 240']-(240', ∞). These classes have been generated considering both network alarm NA duration distribution and maximum presentation delays that can be applied to different types/groups of alarms (defined together with domain experts).

Network alarm NA duration classes are used for unmanaged alarms which expire on their own, while managed alarms are classified accordingly to information (Ack property) added by the NOC unit 130 and TT property, thus originating 8 disjoint classes of alarms: (0, 15']-(15', 30']-(30', 60']-(60', 120']-(120', 240']-(240', ∞)-ACK-TT.

When the class TT assumes a true value, it means that a network alarm NA required an intervention to be cleared through the issuing of a Trouble Ticket TT.

The class ACK may have different values and meanings depending on the network alarm NA type, but typically indicates an action of minor importance (e.g., the NOC unit 130 has to manually correlate an alarm to its root cause alarm, for which a Trouble Ticket TT has been issued).

The combination of network alarm NA duration and information concerning if/how the network alarm NA has been managed is an effective ranking of the network alarm NA importance, especially when alarms prioritization is associated with different presentation delays.

The eight classes described above are an example of how this information can be combined and used to train the machine learning prediction algorithm implemented by the machine learning prediction submodule 425 for predicting network alarm NA importance according to the embodiments of the invention.

Using disjoint classes is particularly efficient when detailed and reliable information about how and when a network alarm NA has been managed is available in the dataset.

According to other embodiments of the invention, when data used to build labels is noisier, alternative approaches may be more appropriate. In these cases, it could be more beneficial to use two independent classifiers, one trained to predict the duration of all alarms (both managed and unmanaged ones) and the other trained to predict only if/how an alarm needs to be managed, i.e., to predict the requirement of a trouble ticket issuing.

In fact, two independent models can typically deal better with wrong label information in the training dataset, due to redundant information contained in different labels (e.g., a network alarm NA requiring a Trouble Ticket TT is typically longer than a network alarm NA which expires on its own).

Different algorithms can be used to implement the classifier previously described.

According to a first embodiment of the present invention, the machine learning prediction algorithm implemented by the machine learning prediction submodule 425 employs the known Gradient Boosting Decision Trees (GBDT, https://en.wikipedia.org/wiki/Gradient_boosting, as available on 14 Dec. 2020), a machine learning technique which is very popular in production systems, because it deals very well with categorical variables and large datasets, and at the same time has lower computational requirements with respect to other techniques like Deep Neural Networks (DNN). The machine learning prediction algorithm implemented by the machine learning prediction submodule 425 has been deployed and tested using LightGBM (https://github.com/microsoft/LightGBM), which is an open source framework implementing GBDT, that outperformed other gradient boosting implementations in terms of both efficiency (memory consumption and speed) and accuracy of the classifier.

According to another embodiment of the present invention, machine learning prediction algorithm implemented by the machine learning prediction submodule 425 is implemented using a DNN. Tests have been carried out, obtaining slightly better accuracy with respect to the use of the LightGBM classifier.

In a first test carried out by the Applicant, 90 days of alarm data AD corresponding to network alarms NA generated by a mobile telecommunication network, including prediction requests PR, have been collected and processed to train and validate a machine learning prediction algorithm in the form of a 8-classes LightGBM classifier, which has been then deployed and used to provide real-time predictions.

Real-time events associated to new network alarms NA, network alarms NA updates and prediction requests PR have been processed by the prediction module 170 and used as input to the trained classifier, which provides predictions for all the network alarms NA specified in the prediction requests PR.

Prediction information generated by the classifier corresponding to the machine learning prediction algorithm implemented by the machine learning prediction submodule 425 consists of 8 probabilities associated to each network alarm NA, where the probabilities specify the likelihood for a network alarm NA to belong to each of the 8 classes. The probabilities are calculated based on the information extracted from the dataset during the training phase of the LightGBM model as for example shown in https://en.wikipedia.org/wiki/Probabilistic_classification, as available on 14 Dec. 2020, and in http://papers.nips.cc/paper/6907-lightgbm-a-highly-efficient-gradient-boosting-decision-tree.pdf.

Moreover, the machine learning prediction algorithm is periodically retrained and updated. In particular, by making reference to the example at issue, a new prediction model is retrained each night on the last 90 days of collected data and then deployed and used to provide new real-time predictions.

The alarm features F used by the machine learning prediction algorithm implemented by the machine learning prediction submodule 425 and obtained from the properties P comprised in the alarm data AD and AD' corresponding to (and thus describing) a specific network alarm NA are many and of heterogeneous types. Some alarm features F are numerical (e.g., the current number of occurrences for a flapping network alarm NA, the number of other network alarms NA correlated to the network alarm NA, etc.), some features are text based (e.g., the full log of the EM module 110($j$) that describes the network alarm NA in a semi-natural-language manner), and mostly are categorical features, i.e., features whose values belong to a not-ordered, enumerable list of values. For example, the severity of a network alarm NA can be categorized among a group of predetermined severity levels, as depicted in the previously described Severity feature, e.g., "critical", "major", "minor", "warning", "clear". Other examples may regard features F providing data regarding information about the geographical location of the network node 105($i$) which triggered the network alarm NA, and/or an identifier of the network node 105($i$) (as depicted in the previously described Location feature), and features F providing a description of the kind of network alarm NA (as depicted in the previously described Description feature), such as 'system fault', 'main power disconnected', 'link unavailable', etc.

According to an embodiment of the present invention these features F are calculated from corresponding properties P and engineered to improve the performance of the machine learning prediction algorithm implemented by the machine learning prediction submodule 425.

According to an embodiment of the present invention, text information in the log message field is exploited. Typical machine learning algorithms can deal with numerical and categorical features, but not with text features. On the other hand, there are other types of machine learning algorithms that deal with text features only and cannot incorporate other type of information. The machine learning prediction algorithm implemented by the machine learning prediction submodule 425 exploits both of these types of models, by using a predictive model that maps text log messages into numerical vectors like word2vec (https://en.wikipedia.org/wiki/Word2vec, as available on 14 Dec. 2020), and then uses these numerical vectors as new features F to augment the information available to the downstream classifier, like GBDT or DNN.

According to an embodiment of the present invention, the features F are engineered by taking into account that it has been observed that in most situations network alarms NA are correlated in space and time. Network alarms NA that are raised by a same network node 105($i$), and that occur close in time, are likely to contain information that relate to each other. For this reason, feature engineering according to an embodiment of the present invention provides for assembling this information.

In particular, according to an embodiment of the present invention each network alarm NA is enriched with (e.g., all) the network alarms NA that have occurred prior to it, raised by the same network node 105($i$) and up to a certain time window (the probability of correlation typically decays exponentially as the network alarms NA are farther distant in time).

According to an embodiment of the present invention, the features F used by the machine learning prediction algorithm implemented by the machine learning prediction submodule 425 to generate the duration AP(d) and/or trouble ticket predictions AP(t) for a network alarm NA triggered by a network node 105($i$), are not only the features F corresponding to the network alarm NA itself, but also those of (e.g., all) the network alarms NA previously triggered within a corresponding preceding time window by the network node 105($i$) or by a set of network nodes 105($i$) that are logically connected and/or geographically located close to the network node 105($i$).

For example, if the number of features F corresponding to a single network alarm NA are 20, and a time window of corresponding to at most 40 preceding network alarms NA is considered, this technique increases the total number of features F to 20×40=800, increasing the information the machine learning prediction algorithm implemented by the machine learning prediction submodule 425 can exploit for generating the duration AP(d) and trouble ticket predictions AP(t).

According to an embodiment of the present invention, prediction requests PR(d), PR(t) can be sent by the AM system 120 to the prediction module 170 immediately after the first occurrence of a network alarm NA or after a fixed delay that can be different for each alarm type or group of alarms.

For example, according to an embodiment of the present invention, the AM system 120 may send a prediction request PR(d) and/or PR(t) after 5 minutes from the first occurrence of the network alarm NA when the Severity property corresponding to the network alarm NA is "critical", and after 30 minutes in all other cases.

According to an embodiment of the present invention, filtering and auto-dispatch logic can be applied to a subset of network alarms NA, and different thresholds (alarm duration thresholds X, duration probability thresholds Y, ticket probability thresholds Z) and extra delays can be used for different types/groups of network alarms NA, thus giving more flexibility to the system.

By taking into consideration an exemplary case in which the machine learning prediction algorithm implemented by the machine learning prediction submodule 425 provides predictions for eight network alarm NA classes CA(m) (m=0 to 7), each one associated with a corresponding probability prob(m), wherein the network alarm NA classes CA(m) are the classes already described above (0, 15']-(15', 30']-(30', 60']-(60', 120']-(120', 240']-(240', ∞)-ACK-TT, an example of classification rules for a network alarm NA having an Severity feature equal to "critical" and an example of classification rules for a network alarm NA having a Severity feature equal to "major" are provided hereinbelow.

```
1) NETWORK ALARM having a CRITICAL severity
X = 30
P(X) = prob(0)+prob(1)
Y = 0.6
Z = 0.8
P(tt) = prob(7)
if (P(X) >= Y):
    'delayed presentation (after X minutes from first occurrence)
else if (P(tt) > Z):
    'create and dispatch TT'
else
    'immediate presentation,
``` wherein, as already described above, X is the alarm duration threshold, Y is the duration probability threshold, P(X) is the short duration alarm probability, P(tt) is the trouble ticket probability, and Z is the ticket probability threshold.

```
2) NETWORK ALARM having a MAJOR severity
X = 60
P(X) = prob(0)+prob(1)+prob(2)
W = prob(6)+prob(7)
Y = 0.4
if (P(X) >= Y and P(X) < W):
    'delayed presentation (after X minutes from first occurrence)
else
    'immediate presentation,
``` wherein W is the probability associated to the event that the network alarm NA will be been managed by the NOC unit 130.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof, on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

The invention claimed is:

1. A system, comprising a plurality of hardware network nodes, including a processor with non-transitory computer readable media, for managing network alarms generated by element manager modules in response to corresponding faults/malfunctioning affecting network nodes or links of a telecommunication network, wherein the system stores software that, when executed by the system, causes the system to:

gather network alarms and generate a first set of network alarms comprising at least a subset of the gathered network alarms;

arrange the network alarms of the first set into a network alarm table providing, for each network alarm listed in the network alarm table, data describing the network alarm, wherein the system manages faults/malfunctioning affecting network nodes or links corresponding to the network alarms based on the network alarm table; and receive an alarm duration prediction request about a predicted duration of a selected network alarm and alarm data regarding the selected network alarm and to generate an alarm duration prediction about a predicted duration of the selected network alarm by processing the alarm data regarding the selected network alarm through a first machine learning algorithm trained with alarm data regarding past network alarms gathered by the system, wherein:

the system generates the at least a subset of the gathered network alarms for generating the first set of network alarms based on the alarm duration predictions, the selected network alarm is generated in response to faults/malfunctioning affecting a first network node of the telecommunication network, and the alarm duration prediction is generated by processing, in addition to the alarm data regarding the selected network alarm, alarm data regarding prior network alarms generated in response to foregoing faults/malfunctioning affecting at least one among:

the first network node, network nodes or links that are logically connected to the first network node, or network nodes or links that are geographically located close to the first network node.

2. The system of claim 1, wherein generating the alarm duration prediction comprises calculating, based on the alarm data regarding the selected network alarm, a duration probability indicative of a probability that the selected network alarm will have a duration shorter than a corresponding alarm duration threshold.

3. The system of claim 2, wherein:

if the duration probability calculated is lower than a corresponding duration probability threshold, the system inserts the selected network alarm into the first set of network alarms; and if the duration probability calculated is higher than or equal to the corresponding duration probability threshold, the system inserts the selected network alarm in a waiting queue for a time period corresponding to the alarm duration threshold, and then inserts the selected network alarm into the first set of network alarms if the selected network alarm has not subsided yet after expiration of the alarm duration threshold.

4. The system of claim 1, wherein the system stores additional software that, when executed by the system, causes the system to:

receive a trouble ticket prediction request corresponding to the selected network alarm; and generate a trouble ticket prediction by processing the alarm data regarding the selected network alarm to calculate a trouble ticket probability indicative of a probability of a need of issuing a Trouble ticket for solving faults/malfunctioning affecting a network node corresponding to the selected network alarm.

5. The system of claim 4, wherein:

generating the selected network alarm comprises generating, in response to faults/malfunctioning affecting a first network node of the telecommunication network, the selected network alarm; and generating the trouble ticket prediction comprises generating the trouble ticket prediction by processing, in addition to the alarm data regarding the selected network alarm, alarm data regarding prior network alarms generated in response to foregoing faults/malfunctioning affecting at least one among:
the first network node;
network nodes or links that are logically connected to the first network node; or
network nodes or links that are geographically located close to the first network node.

6. The system of claim 4, wherein calculating the trouble ticket probability comprises processing the alarm data regarding the selected network alarm through a second machine learning algorithm trained with alarm data regarding past network alarms gathered by the system.

7. The system of claim 6, wherein training the first machine learning algorithm comprises training the first machine learning algorithm independently from the second machine learning algorithm.

8. The system of claim 4, where the system stores additional software that, when executed by the system, causes the system to:
if the trouble ticket probability is higher than or equal to a ticket probability threshold, generate a trouble ticket regarding the selected network alarm.

9. The system of claim 2, the system stores additional software that, when executed by the system, causes the system to:
receive a trouble ticket prediction request corresponding to the selected network alarm and generate a trouble ticket prediction by processing the alarm data regarding the selected network alarm to calculate a trouble ticket probability indicative of a probability of a need of issuing a Trouble ticket for solving faults/malfunctioning affecting a network node corresponding to the selected network alarm, and
insert the selected network alarm in a waiting queue before adding the selected network alarm to the first set based on a combination of the duration probability and the trouble ticket probability.

10. The system of claim 1, wherein the alarm data regarding a network alarm comprises at least one among:
data indicative of an active/inactive status of the network alarm;
data about a severity level of the network alarm among a set of predetermined severity levels;
data about geographical location of a network node having triggered the network alarm;
an identifier of the network node having triggered the network alarm;
data providing a category identifier of the network alarm; or
collected system logs regarding the network alarm.

11. A method for managing network alarms generated by element manager modules in response to corresponding faults/malfunctioning affecting network nodes of a telecommunication network, the method comprising:
gathering network alarms and generating a first set of network alarms comprising at least a subset of the gathered network alarms;
arranging the network alarms of the first set into a network alarm table providing, for each network alarm listed in the network alarm table, data describing the network alarm;
managing faults/malfunctioning affecting the network nodes corresponding to the network alarms based on the network alarm table; and
receiving an alarm duration prediction request about a predicted duration of a selected network alarm and alarm data regarding the selected network alarm and generating an alarm duration prediction about a predicted duration of the selected network alarm by processing the alarm data regarding the selected network alarm through a first machine learning algorithm trained with alarm data regarding past gathered network alarms, wherein:
the at least a subset of the gathered network alarms for generating the first set of network alarms is generated based on the alarm duration predictions,
the selected network alarm is generated in response to faults/malfunctioning affecting a first network node of the telecommunication network, and
the alarm duration prediction is generated by processing, in addition to the alarm data regarding the selected network alarm, alarm data regarding prior network alarms generated in response to foregoing faults/malfunctioning affecting at least one among:
the first network node,
network nodes or links that are logically connected to the first network node, or
network nodes or links that are geographically located close to the first network node.

12. The method of claim 11, wherein generating the alarm duration prediction comprises calculating, based on the alarm data regarding the selected network alarm, a duration probability indicative of a probability that the selected network alarm will have a duration shorter than a corresponding alarm duration threshold.

13. The method of claim 12, further comprising:
if the duration probability calculated is lower than a corresponding duration probability threshold, inserting the selected network alarm into the first set of network alarms; and
if the duration probability calculated is higher than or equal to the corresponding duration probability threshold, inserting the selected network alarm in a waiting queue for a time period corresponding to the alarm duration threshold, and then inserts the selected network alarm into the first set of network alarms if the selected network alarm has not subsided yet after expiration of the alarm duration threshold.

14. The method of claim 11, further comprising:
receiving a trouble ticket prediction request corresponding to the selected network alarm; and
generating a trouble ticket prediction by processing the alarm data regarding the selected network alarm to calculate a trouble ticket probability indicative of a probability of a need of issuing a Trouble ticket for solving faults/malfunctioning affecting a network node corresponding to the selected network alarm.

15. The method of claim 14, wherein:
generating the selected network alarm comprises generating, in response to faults/malfunctioning affecting a first network node of the telecommunication network, the selected network alarm; and
generating the trouble ticket prediction comprises generating the trouble ticket prediction by processing, in addition to the alarm data regarding the selected network alarm, alarm data regarding prior network alarms generated in response to foregoing faults/malfunctioning affecting at least one among:

the first network node;
network nodes or links that are logically connected to the first network node; or
network nodes or links that are geographically located close to the first network node.

16. The method of claim 14, wherein calculating the trouble ticket probability comprises processing the alarm data regarding the selected network alarm through a second machine learning algorithm trained with alarm data regarding past network alarms.

17. The method of claim 16, wherein training the first machine learning algorithm comprises training the first machine learning algorithm independently from the second machine learning algorithm.

18. The method of claim 14, further comprising:
if the trouble ticket probability is higher than or equal to a ticket probability threshold, generating a trouble ticket regarding the selected network alarm.

19. The method of claim 12, further comprising:
receiving a trouble ticket prediction request corresponding to the selected network alarm and generate a trouble ticket prediction by processing the alarm data regarding the selected network alarm to calculate a trouble ticket probability indicative of a probability of a need of issuing a Trouble ticket for solving faults/malfunctioning affecting a network node corresponding to the selected network alarm, and
inserting the selected network alarm in a waiting queue before adding the selected network alarm to the first set based on a combination of the duration probability and the trouble ticket probability.

20. The method of claim 11, wherein the alarm data regarding a network alarm comprises at least one among:
data indicative of an active/inactive status of the network alarm;
data about a severity level of the network alarm among a set of predetermined severity levels;
data about geographical location of a network node having triggered the network alarm;
an identifier of the network node having triggered the network alarm;
data providing a category identifier of the network alarm; or
collected system logs regarding the network alarm.

* * * * *